(12) United States Patent
Hale et al.

(10) Patent No.: US 8,392,825 B2
(45) Date of Patent: *Mar. 5, 2013

(54) DOCUMENT PROCESSOR AND RE-AGGREGATOR

(75) Inventors: Leland E. Hale, South Colby, WA (US); Sandeep S. Sahasrabudhe, Kirkland, WA (US); Ajitesh Kishore, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 268 days.

This patent is subject to a terminal disclaimer.

(21) Appl. No.: 12/850,350

(22) Filed: Aug. 4, 2010

(65) Prior Publication Data

US 2011/0029850 A1  Feb. 3, 2011

Related U.S. Application Data

(63) Continuation of application No. 11/277,682, filed on Mar. 28, 2006, now Pat. No. 7,793,216.

(51) Int. Cl.
   *G06F 17/00* (2006.01)
(52) U.S. Cl. ..................................... 715/243
(58) Field of Classification Search .................. 715/252, 715/253, 254, 255, 256, 273, 243
   See application file for complete search history.

(56) References Cited

U.S. PATENT DOCUMENTS

| 6,023,714 | A * | 2/2000 | Hill et al. ............. 715/235 |
| 6,266,683 | B1 | 7/2001 | Yehuda et al. |
| 6,570,585 | B1 | 5/2003 | Hines et al. |
| 2002/0065848 | A1 | 5/2002 | Walker et al. |
| 2002/0099739 | A1 | 7/2002 | Fischer |
| 2003/0023632 | A1 | 1/2003 | Ries et al. |
| 2003/0164855 | A1 * | 9/2003 | Grant et al. ............. 345/763 |
| 2004/0139397 | A1 | 7/2004 | Yuan et al. |
| 2004/0205653 | A1 | 10/2004 | Hadfield et al. |

FOREIGN PATENT DOCUMENTS

| JP | 2001-337887 | 12/2001 |
| JP | 2002-007269 | 1/2002 |
| JP | 2005-078584 | 3/2005 |

OTHER PUBLICATIONS

"European Search Report", Mailed Date: Apr. 19, 2011, Application No. EP/07752704, Filed Date: Apr. 19, 2011, pp. 7.
Kaljuvee, et al., "Efficient Web form Entry on PDAs", Retrieved at <<http://delivery.acm.org/10.1145/380000/372180/p663-kaljuvee.pdf?key1=372180&key2=5137712031&coll=DL&dl=ACM&ip=145.64.134.241&CFID=15363382&CFTOKEN=56730346>>, Proceedings of the 10th international conference on World Wide Web, May 1-5, 2001, pp. 663-672.

* cited by examiner

*Primary Examiner* — Laurie Ries

(57) ABSTRACT

A method and system for implementing a document processor and re-aggregator is described herein. A document is divided into one or more sections and formatting is removed. A condensed document is generated that includes one or more links to the one or more sections. The condensed document is transmitted to a mobile device to be displayed for a user. The user may choose to download one or more of the sections by selecting one or more of the links. Once downloaded, a section may be modified by the user. The one or more modified sections may be transmitted from the mobile device. The one or more modified sections may then be re-aggregated with the unmodified sections to form a revised document.

20 Claims, 10 Drawing Sheets

Table of Contents

Lorem ipsum.................................................................................................................. 1
   Ut wisi................................................................................................................... 1
   Duis autem vel eum............................................................................................. 1
      Nam liber tempor............................................................................................ 1
      Typi non habent.............................................................................................. 1
Duis autem vel................................................................................................................ 1
   Claritas est etiam.................................................................................................. 1
   Mirum est notare.................................................................................................. 2
      Ut wisi enim ad............................................................................................... 2
      Est aliquip ex.................................................................................................. 2

---

Lorem ipsum

▸ Dolor sit amet, consectetuer adipiscing elit, sed diam nonummy nibh euismod tincidunt ut laoreet dolore magna aliquam erat volutpat.  *(402)*

*Ut wisi*

▸ Enim ad minim veniam, quis nostrud exercitation ullamcorper suscipit lobortis nisl ut aliquip ex ea commodo consequat. *(404)*

*Duis autem vel eum*

▸ Iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait nulla facilisi. *(406)*

Nam liber tempor

▸ Cum soluta nobis eleifend option congue nihil imperdiet doming id quod mazim placerat facer possim assum. *(408)*

FIG. 4

Lorem ipsum dolor sit amet, consectetur adipiscing elit. Maecenas auctor, urna ac imperdiet lobortis, nisl enim ultrices dui, vel cursus quam massa et risus. Suspendisse id augue vitae lacus viverra tempor. Etiam nulla lorem, ullamcorper eget imperdiet eu, accumsan sed elit.

Nunc luctus euismod tincidunt. Suspendisse condimentum eros nec justo varius rutrum. In libero enim, accumsan sit amet feugiat nec, hendrerit suscipit nisl.

DUIS AUTEM VEL
Nam ultrices tellus non mauris vulputate ultrices. Phasellus tellus erat, euismod ut facilisis at, auctor at mauris. Nam est mauris, blandit sed commodo non, egestas ac orci. Pellentesque egestas, nibh sit amet facilisis dapibus, risus elit commodo turpis, ac rutrum ipsum nisl at augue. Suspendisse pharetra pretium nulla ut interdum lobortis quam ullamcorpe

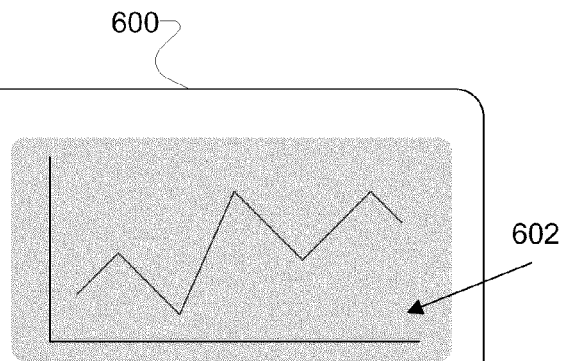

Sed a sollicitudin eros. Nunc dictum vestibulum fringilla lobortis.

id lorem et eros vehicula tempor vel ac justo

DOLORE MAGNA ALIQUAM ERAT
Nulla fringilla, dui vel lobortis fringilla, sapien nulla cursus neque, quis laoreet nunc odio at eros. Cras tempus, lorem ut molestie tempor, risus metus lobortis velit, a faucibus lorem nunc sed felis.

Phasellus sed justo enim. Ut dictum bibendum sem sodales luctus. Maecenas fringilla erat ut mi.

FIG. 6

DOCUMENT PROCESSOR AND RE-AGGREGATOR

CROSS REFERENCE TO RELATED APPLICATION

This application is a continuation of U.S. application Ser. No. 11/277,682 filed Mar. 28, 2006 entitled "DOCUMENT PROCESSOR AND RE-AGGREGATOR"

BACKGROUND

An increasing number of mobile devices, such as cell phones and pocket PCs, are giving users the ability to read and edit documents. However, the ability to read and edit these documents is constrained by the limited screen size available on the mobile device. Furthermore, downloading a large document that may include graphs, images, embedded audio and/or video is a challenge. Not only may it take a long time to download a large document but the download may also be constrained by the storage limitations of the mobile device.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are various technologies and techniques directed to methods and systems for a document processor and re-aggregator. In accordance with one implementation of the described technologies, a document is divided into one or more sections and formatting is removed. A condensed document is generated that includes one or more links to the one or more sections. The condensed document is transmitted to a mobile device to be displayed for a user. The user may choose to download one or more of the sections by selecting one or more of the links. Once downloaded, a section may be modified by the user. The modified section may then be transmitted from the mobile device. The modified section may then be re-aggregated with the unmodified sections to form a revised document.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 4 is a screenshot of an exemplary document.

FIG. 6 is a screenshot of an exemplary document.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
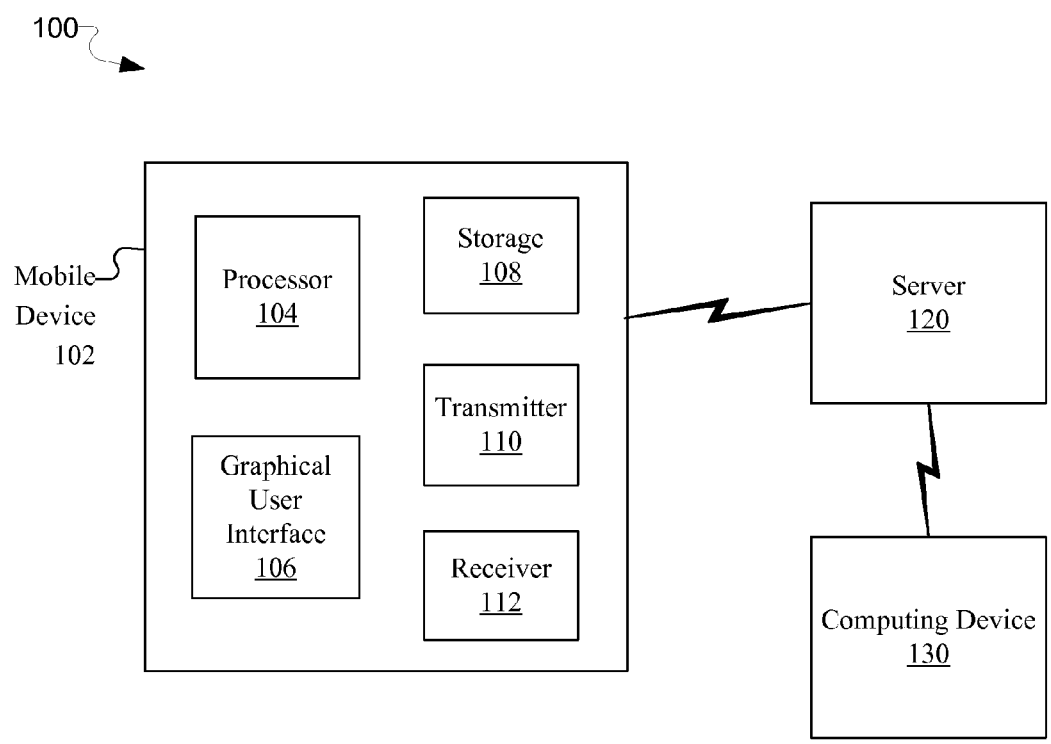
FIG. 1 is a block diagram illustrating an exemplary system for implementing a document processor and re-aggregator.

FIG. 1 is a block diagram illustrating an exemplary system 100 for implementing a document processor and re-aggregator. System 100 includes a server 120 communicatively coupled to a mobile device 102 and a computing device 130. Mobile device 102 includes a processor 104, a graphical user interface 106, storage 108, a transmitter 110, and a receiver 112. A document may be created by a user on the computing device 130. The document is divided into one or more sections. For example, the document may be divided based on the headers, pages, paragraphs, a table of contents, or via any other identifiable unit in the document. Each section may be given a unique number and version. Formatting may be removed from the document. For example, special fonts, paragraph formatting, and other types of formatting may be removed. The original formatting may be saved and used in the re-aggregation process. The original document may also be saved as an original version.

A condensed document is generated from the original document. The condensed document includes links to each of the sections of the original document. For example, if the original document was divided into sections based on the headers in the document, then the condensed document would include a link to each header, and each link would specify the name of the corresponding header. Each link may also specify one or more words in the corresponding section. For example, if the document is divided into sections based on paragraphs, then each link may specify one or more words that begin each corresponding paragraph. Each link may also indicate the file size of the corresponding section.

When there are items in the original document other than text, then a link may be included in the condensed document for each of these items. For example, a link may be included for a table, graph, image, audio, or video. Each link may also indicate the file size of the corresponding item.

After the condensed document is generated, the condensed document may be sent to a mobile device, such as 102. The mobile device 102 may display the condensed document for a user. The user may choose to download a section of the document by selecting the corresponding link. The file size of the section may be indicated in the link to let the user know approximately how big the section is and how long it may take to download the section. The user may also choose to download a table, graph, image, audio, video, or any other item within the document by selecting the corresponding link. The user may choose to download one section or item, may choose to download multiple sections or items, or may choose to download the entire document at once.

After a section is downloaded, the mobile device may display the section for the user. The user may then modify the section. The user may then choose to send the modified document back to the creator of the original document. The modified document may then be transmitted from the mobile device 102. The server 120 receives the modified document and compares each section of the modified document to each section of the original document. If there are changes to a section, then the modified section received from the mobile device is used to replace the original section. After all sections of the document are compared and any modified sections replaced, the server 120 re-aggregates the document. The previously removed formatting may then be added back into the document. The re-aggregated document may be saved as a revised version of the original document. The re-aggregated document may then be sent to the computing device 130. The re-aggregated document may then be displayed for the creator of the original document. Since the original version of the document was saved previously, after viewing the re-aggregated document, the creator of the original document may choose to revert to the original version of the document.

Figure 2:
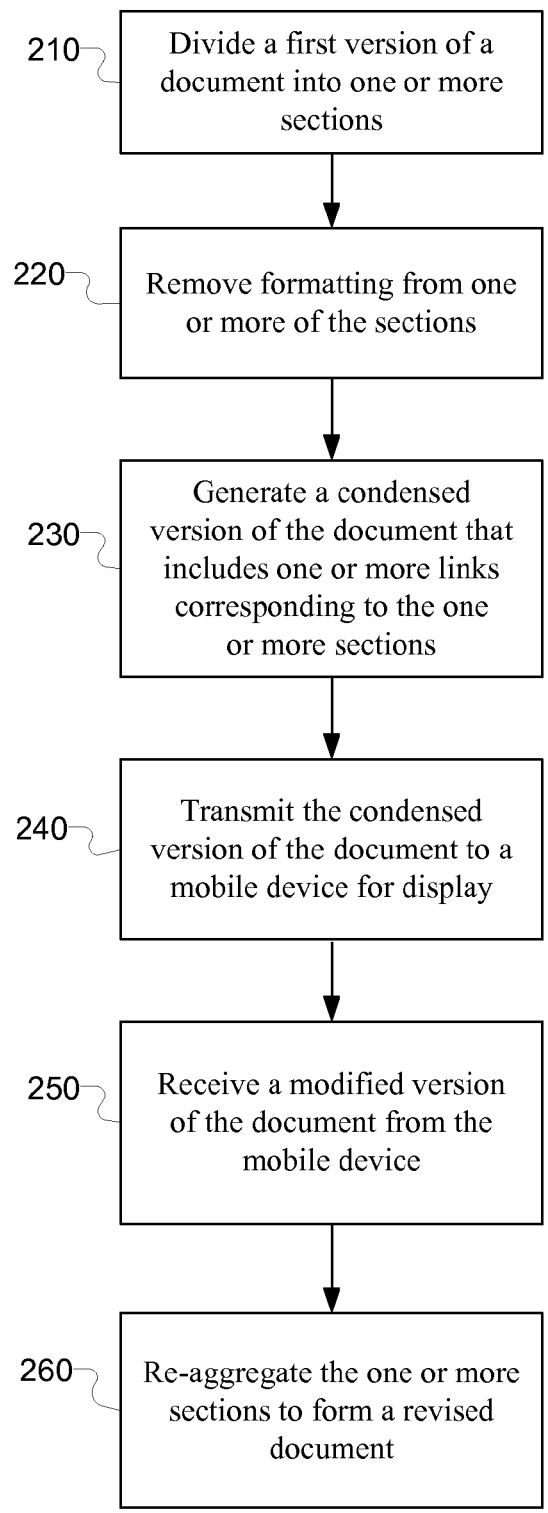
FIG. 2 is a flow diagram illustrating an exemplary process for sectioning and re-aggregating a document.
Figure 3:
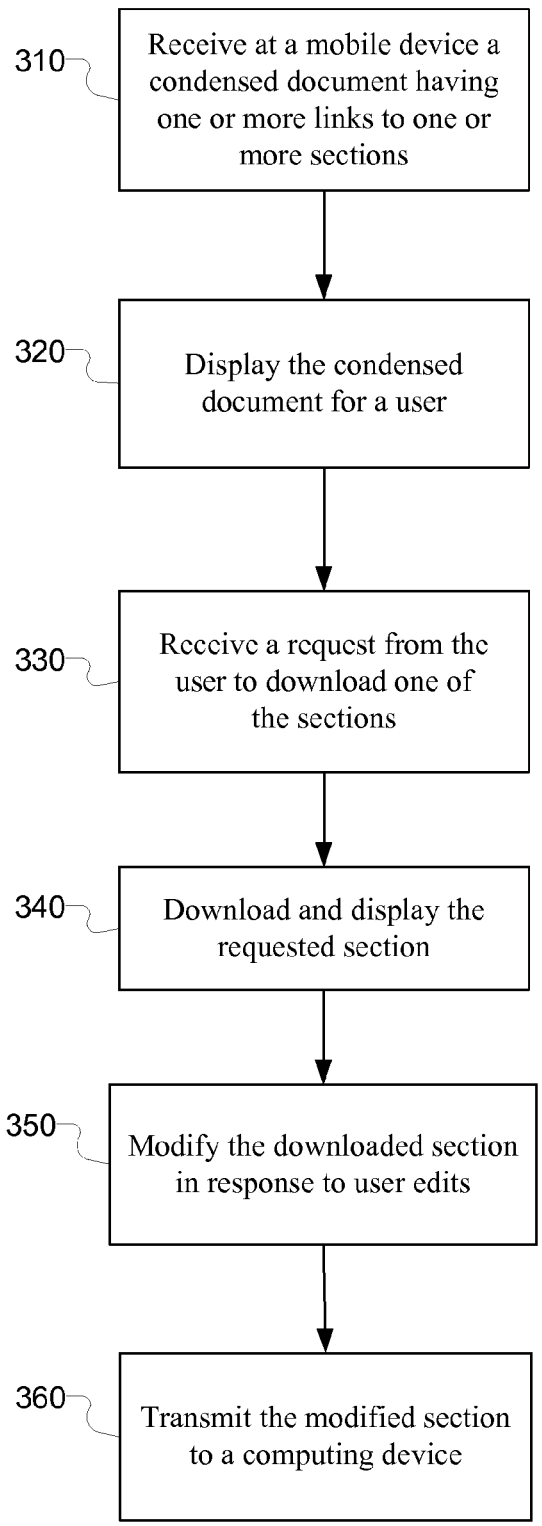
FIG. 3 is a flow diagram illustrating an exemplary process for displaying and modifying a sectioned document.

FIGS. 2-3 are flow diagrams illustrating exemplary processes for document processing and re-aggregation. While the description of FIGS. 2-3 may be made with reference to other figures, it should be understood that the exemplary processes illustrated in FIGS. 2-3 are not intended to be limited to being associated with the systems or other contents of any specific figure or figures. Additionally, it should be understood that while the exemplary processes of FIGS. 2-3 indicate a particular order of operation execution, in one or more alternative implementations, the operations may be ordered differently. Furthermore, some of the steps and data illustrated in the exemplary processes of FIGS. 2-3 may not be necessary and may be omitted in some implementations. Finally, while the exemplary processes of FIGS. 2-3 contains multiple discrete steps, it should be recognized that in some environments some of these operations may be combined and executed at the same time.

FIG. 2 is a flow diagram illustrating an exemplary process for sectioning and re-aggregating a document. At 210, a first version of a document is divided into one or more sections. These sections may correspond to headers, paragraphs, pages, or any other units or items in the document. At 220, formatting may be removed from one or more of the sections. For example, special fonts, paragraph formatting, or other formatting in the document may be removed. At 230, a condensed version of the document is generated. The condensed version of the document includes one or more links corresponding to the one or more sections. A link may specify one or more words in the corresponding section. The one or more links may include a link to a table, graph, image, audio, or video. A link may also specify the file size of the corresponding section or linked item. At 240, the condensed version of the document may be transmitted to a mobile device. The mobile device may process the document and display the document for a user. The user may select to download one or more of the sections. Once the full text of a section has been downloaded, the user may read and/or edit the section. The user may then choose to send back a modified version of the document. At 250, a modified version of the document may be received from the mobile device. Each section of the modified version of the document received from the mobile device may be compared with each section of the first version of the document to determine whether there are any changes. If a section has been changed, the modified version of the section may be used to replace the first version of the section. After each section has been compared and any modified sections replaced, then at 260, the sections are re-aggregated to form a revised document. The formatting that was removed at step 220 may be added back into the revised document. The revised document may then be displayed for the creator of the first version of the document.

FIG. 3 is a flow diagram illustrating an exemplary process for displaying and modifying a sectioned document. At 310, a condensed document is received at a mobile device. The condensed document may include one or more links to one or more sections and/or one or more downloadable items. At 320, the condensed document is displayed for a user. A user may select to download one or more of the sections or items by selecting the corresponding link. At 330, the user's request to download one or more of the sections or items is received by the mobile device. At 340, the requested one or more sections or items are downloaded and displayed for the user. The user may modify a downloaded section. For example, the user may use Microsoft® Office for Windows® Mobile to read and modify a downloaded section. At 350, the downloaded section is modified in response to user edits. At 360, the modified section may be transmitted to a computing device. The modified section may be re-aggregated with the unmodified sections to form a revised document. The revised document may then be displayed for the creator of the original document.

FIG. 4 is a screenshot of an exemplary document 400. The exemplary document 400 includes a number of headers, such as Lorem ipsum, Ut wisi, Duis autem vel eum, and Nam liber tempor. The headers are also listed on a Table of Contents at the beginning of the document. The document 400 may be divided into sections based on the headers in the document. For example, section 402 includes the text under the header "Lorem ipsum", section 404 includes the text under the header "Ut wisi", section 406 includes the text under the header "Duis autem vel eum", and section 408 includes the text under the header "Nam liber tempor". A condensed document may then be generated that includes a link to each section. The condensed document may then be transmitted to a mobile device and displayed for a user as shown in FIG. 5.

Figure 5:
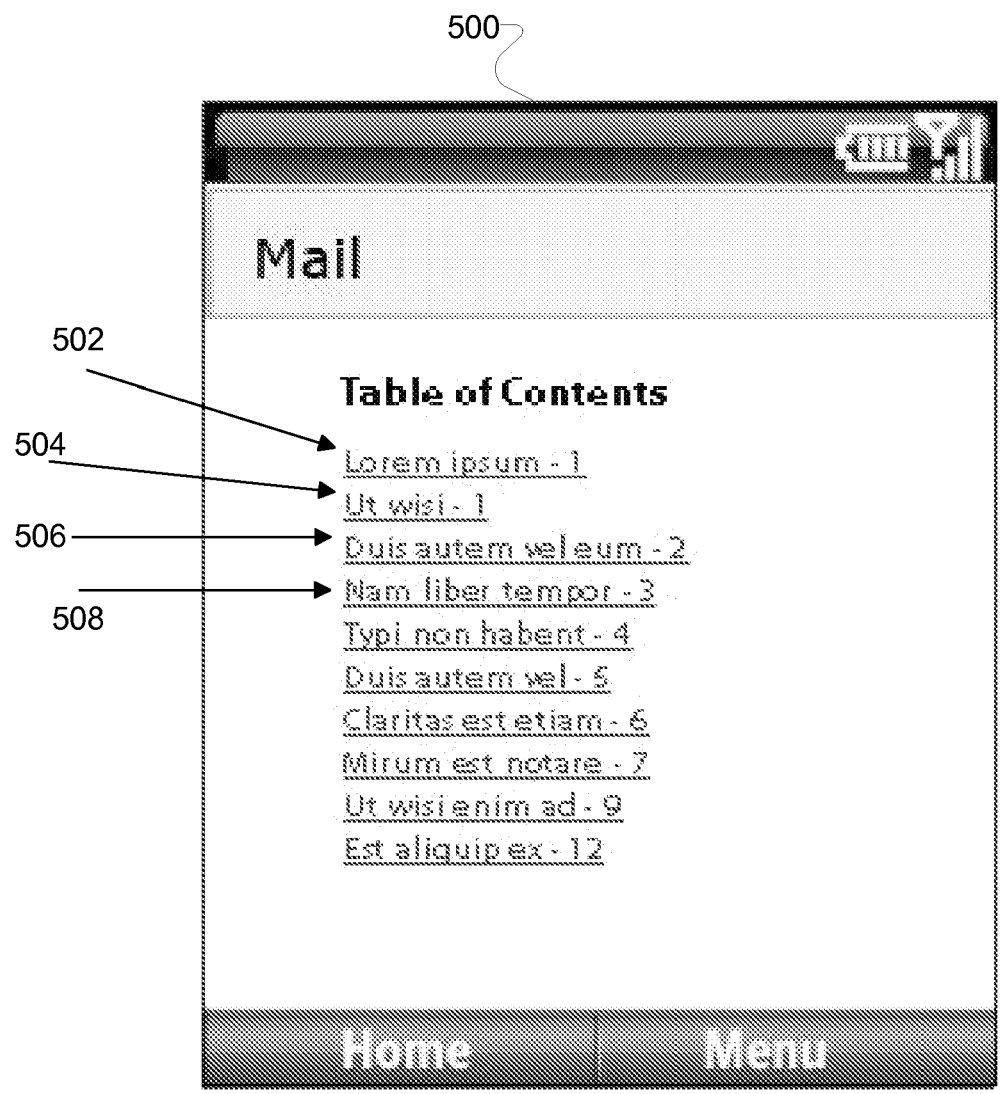
FIG. 5 is a screenshot of an exemplary condensed document displayed on a mobile device.

FIG. 5 is a screenshot of an exemplary condensed document 500 displayed on a mobile device. Each link included in the condensed document 500 corresponds to a section of the document 400 shown in FIG. 4. Each link specifies the name of the header of the corresponding section. For example, link 502 specifies the header "Lorem ipsum", which is the header of the corresponding section 402, link 504 specifies the header "Ut wisi", which is the header of the corresponding section 404, link 506 specifies the header "Duis autem vel eum", which is the header of the corresponding section 406, and link 508 specifies the header "Nam liber tempor", which is the header of the corresponding section 408. Each link may also specify a page number of the corresponding section. For example, link 504 indicates that the section with the header "Ut wisi" starts on page 1 of the document and link 506 indicates that the section with the header "Duis autem veleum" starts on page 2 of the document when viewed on the mobile device.

A user may choose to download a section by selecting the corresponding link. The user may also choose to download multiple sections or to download the entire document. The selected one or more sections are then downloaded and the full text of each selected section is displayed for the user. For example, if the user selects link 502, then section 402 of document 400 would be downloaded, and the full text of section 402 would be displayed as follows: "Dolor sit amet, consectetuer adipiscing elit, sed diam nonummy nibh euismod tincidunt ut laoreet dolore magna aliquam erat volutpat." Once a section is downloaded, the user may read and edit the section. The user may then choose to send the revised section to the creator of the original document.

FIG. 6 is a screenshot of an exemplary document 600. Document 600 includes a FIG. 602. Document 600 may be divided based on the headings, such as "DUIS AUTEM VEL" and "DOLORE MAGNA ALIQUAM ERAT." A condensed document may be generated that has a link to each of the headings and a link to the figure. Alternatively, since this document is short, the condensed document may contain the full text of the document with a link to the figure. The condensed document may be sent to a mobile device for display as shown in FIG. 7.

Figure 7:
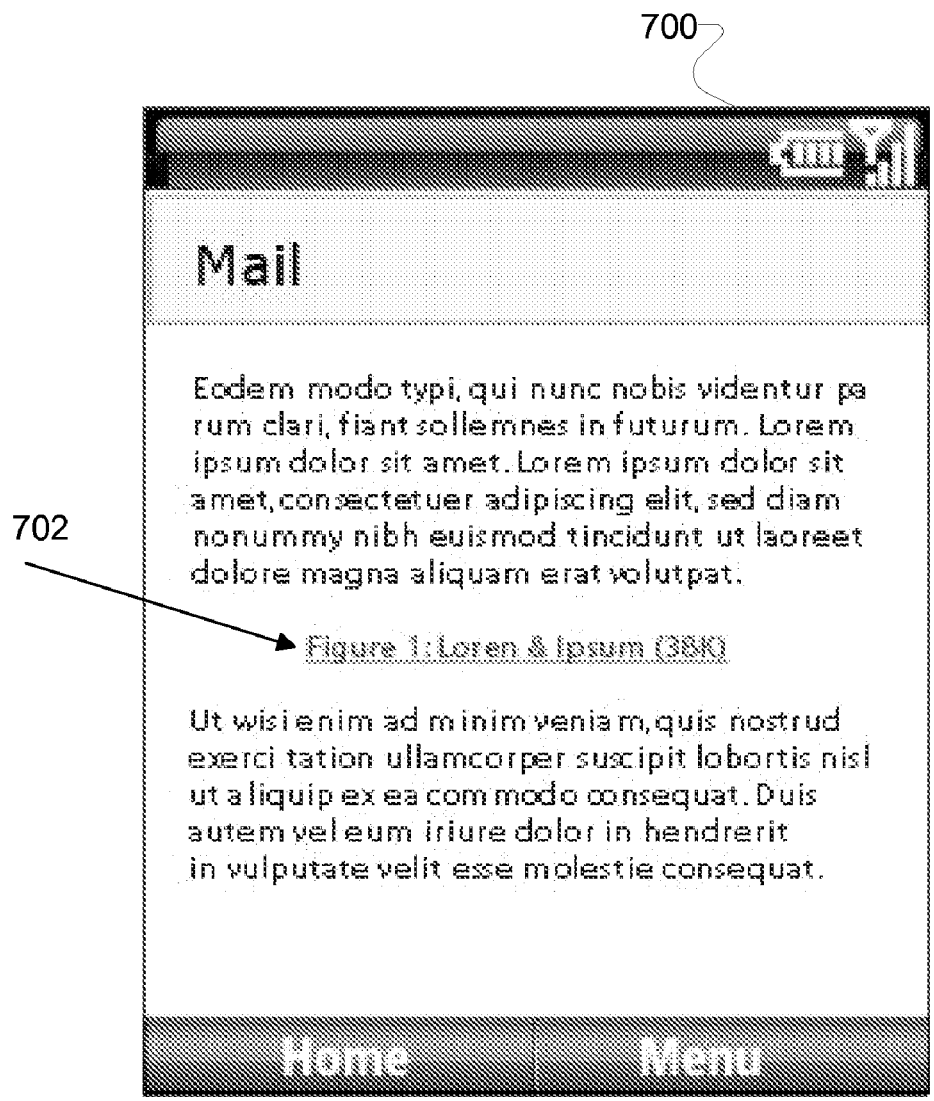
FIG. 7 is a screenshot of an exemplary condensed document displayed on a mobile device.

FIG. 7 is a screenshot of an exemplary condensed document 700 displayed on a mobile device. The condensed document 700 includes the full text of the document 600 shown in FIG. 6 and a link 702 to the FIG. 602. A user may scroll from one page to the next to read and/or edit the document. To look at the figure, the user may select the link 702 entitled "FIG. 1: Loren & Ipsum (38 k)." The link 702 specifies the size of the FIG. 602 (38 k) to let the user know approximately how big the figure is and how long it might take to download the figure. When the user selects link 702, the FIG. 602 is downloaded and then displayed on the mobile device for the user. If the user modifies the document, the user may then send the modified document to the creator of the original document.

Figure 8:
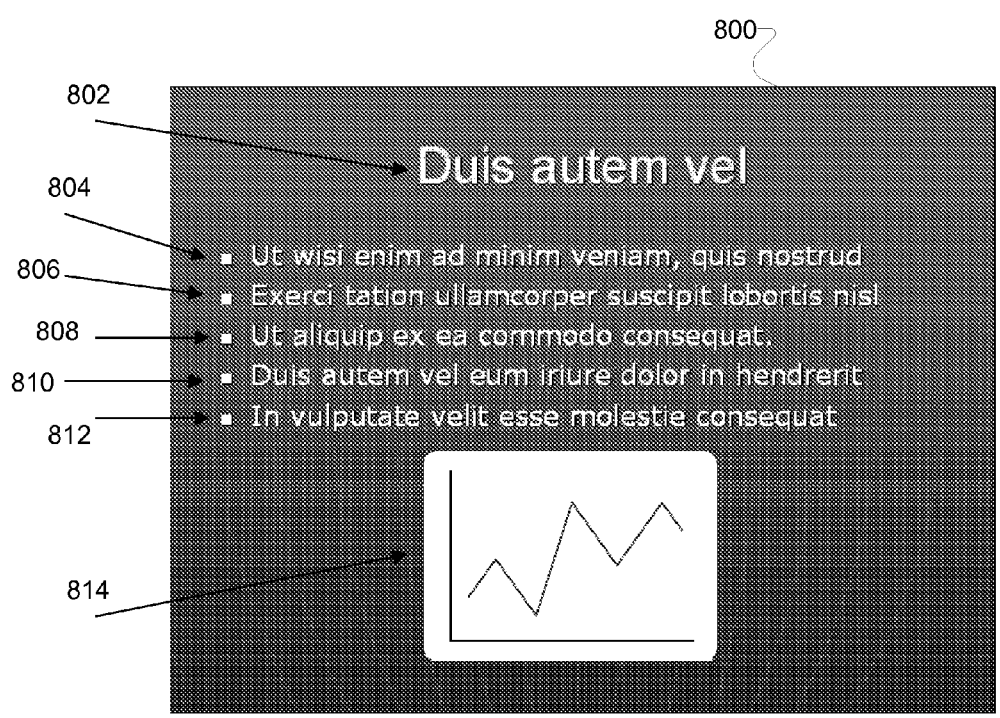
FIG. 8 is a screenshot of an exemplary presentation document.

FIG. 8 is a screenshot of an exemplary presentation document 800. A condensed document may be generated that includes the title 802, bullet points 804, 806, 808, 810, and 812, and a link to the FIG. 814. This condensed document may then be transmitted to a mobile device for display as shown in FIG. 9.

Figure 9:
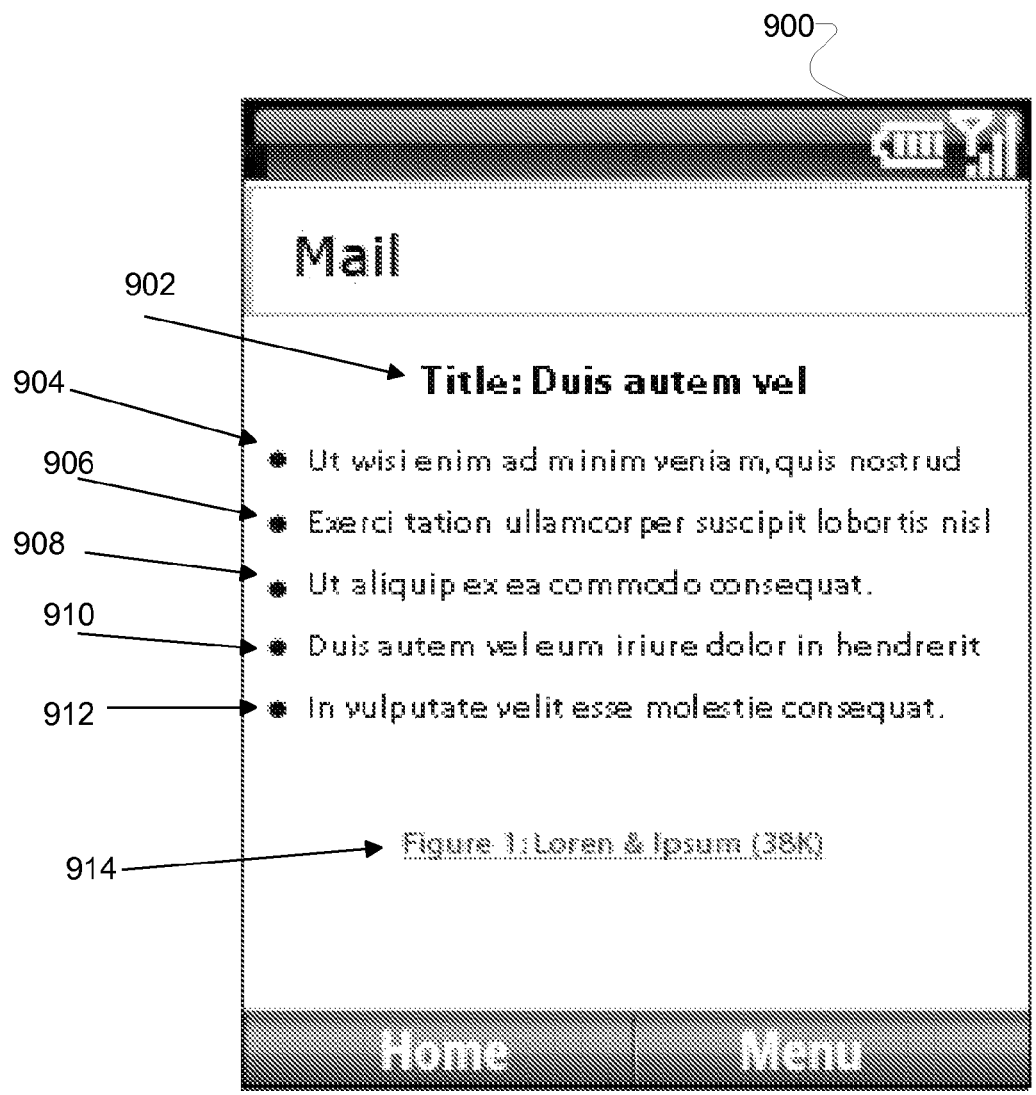
FIG. 9 is a screenshot of an exemplary condensed presentation document displayed on a mobile device.

FIG. 9 is a screenshot of an exemplary condensed presentation document 900 displayed on a mobile device. The condensed presentation document 900 includes a title and bullet points that correspond to the title and bullet points in presentation document 800 shown in FIG. 8. For example, title 902 corresponds to title 802, and bullet points 904, 906, 908, 910, and 912 correspond to bullet points 804, 806, 808, 810, and 812, respectively. The condensed document 900 also includes a link 914 to FIG. 814. A user may choose to download the FIG. 814 by selecting the link 914, which is entitled "FIG. 1: Loren & Ipsum (38 k). The file size, 38 k, is displayed to indicate the size of the FIG. 814. Once downloaded, the FIG. 814 may be displayed for the user. The user may choose to edit the presentation document and then send the modified presentation document back to the creator of the original presentation document.

Figure 10:
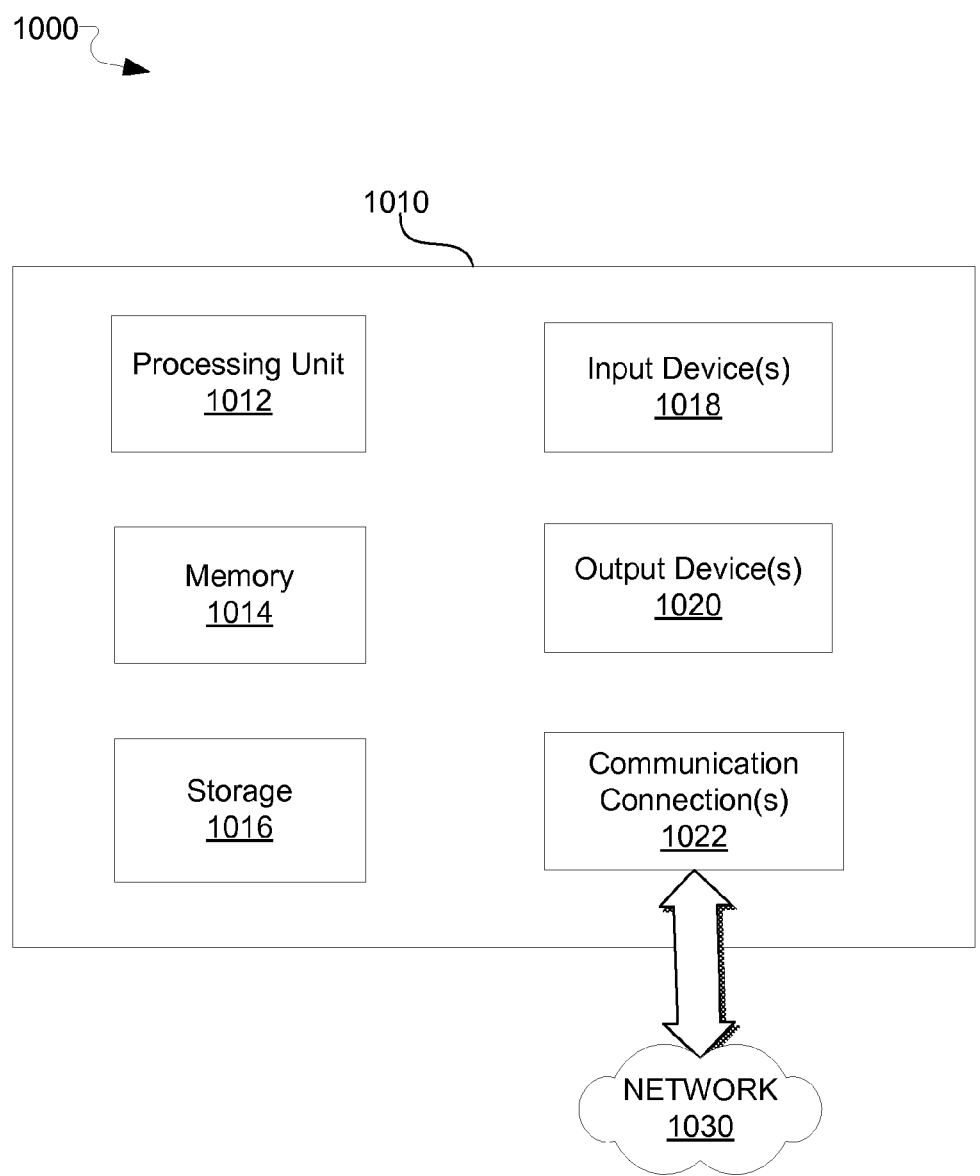
FIG. 10 illustrates an exemplary computing environment in which certain aspects of the invention may be implemented.

FIG. 10 illustrates an exemplary computing environment in which certain aspects of the invention may be implemented. It should be understood that computing environment 1000 is only one example of a suitable computing environment in which the various technologies described herein may be employed and is not intended to suggest any limitation as to the scope of use or functionality of the technologies described herein. Neither should the computing environment 1000 be interpreted as necessarily requiring all of the components illustrated therein.

The technologies described herein may be operational with numerous other general purpose or special purpose computing environments or configurations. Examples of well known computing environments and/or configurations that may be suitable for use with the technologies described herein include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

With reference to FIG. 10, computing environment 1000 includes a general purpose computing device 1010. Components of computing device 1010 may include, but are not limited to, a processing unit 1012, a memory 1014, a storage device 1016, input device(s) 1018, output device(s) 1020, and communications connection(s) 1022.

Processing unit 1012 may include one or more general or special purpose processors, ASICs, or programmable logic chips. Depending on the configuration and type of computing device, memory 1014 may be volatile (such as RAM), non-volatile (such as ROM, flash memory, etc.) or some combination of the two. Computing device 1010 may also include additional storage (removable and/or non-removable) including, but not limited to, magnetic or optical disks or tape. Such additional storage is illustrated in FIG. 10 by storage 1016. Computer storage media includes volatile and nonvolatile, removable and non-removable media implemented in any method or technology for storage of information such as computer readable instructions, data structures, program modules or other data. Memory 1014 and storage 1016 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 1010. Any such computer storage media may be part of computing device 1010.

Computing device 1010 may also contain communication connection(s) 1022 that allow the computing device 1010 to communicate with other devices, such as with other computing devices through network 1030. Communications connection(s) 1022 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes storage media.

Computing device 1010 may also have input device(s) 1018 such as a keyboard, a mouse, a pen, a voice input device, a touch input device, and/or any other input device. Output device(s) 1020 such as one or more displays, speakers, printers, and/or any other output device may also be included.

While the invention has been described in terms of several exemplary implementations, those of ordinary skill in the art will recognize that the invention is not limited to the implementations described, but can be practiced with modification and alteration within the spirit and scope of the appended claims. The description is thus to be regarded as illustrative instead of limiting.

The invention claimed is:

1. A method comprising:
dividing a first version of a document into one or more sections;

generating a condensed version of the document that includes a linkcorresponding to at least one of the one or more sections;

transmitting the condensed version of the document to a mobile device for display;

receiving a modified version of the document from the mobile device, the modified version including one or more edits to one or more of the sections; and re-aggregating the modified one or more sections with unmodified sections to form a revised document.

2. The method of claim 1, wherein re-aggregating the one or more sections to form a revised document comprises comparing each section of the modified version of the document with each section of the first version of the document to determine whether there are any changes to each section.

3. The method of claim 1, wherein the revised document includes previously removed formatting.

4. The method of claim 1, wherein the one or more sections correspond to one or more headers in the first version of the document.

5. The method of claim 1, wherein the one or more sections correspond to one or more paragraphs in the first version of the document.

6. The method of claim 1, wherein the one or more sections correspond to one or more pages in the first version of the document.

7. The method of claim 1, wherein one or more of the links indicates a file size of the corresponding section.

8. The method of claim 1, wherein one or more of the links specifies one or more words in the corresponding section.

9. The method of claim 1, wherein the one or more links in the condensed document are formatted into a table of contents.

10. The method of claim 1, wherein the one or more links includes a link to a table.

11. The method of claim 1, wherein the one or more links includes a link to a graph.

12. An apparatus, comprising:
a server operative to:
receive a document from a computing device;
divide the document into a plurality of sections;
create a condensed document that includes links to one or more sections of the document;
transmit the condensed document to a mobile device;
receive a modified version of the document from the mobile device, the modified version including one or more edits to one or more of the sections; and
re-aggregate the modified one or more sections with unmodified sections to form a revised document.

13. The apparatus of claim 12, the server further to:
receive the modified section;
aggregate the modified section with unmodified sections to form a revised document; and
transmit the revised document to the computing device.

14. The apparatus of claim 12, wherein one or more of the links indicates a file size of the corresponding section.

15. An apparatus, comprising:
a mobile device operative to:
receive a condensed document, the condensed document having a link to a section of the document on a server, wherein the link indicates a file size of the section;
download the section from the server;
modify the downloaded section at the mobile device; and
transmit the modified section to the server.

16. The apparatus of claim 15, the mobile device further to:
display the condensed document for a user.

17. The apparatus of claim 15, the mobile device further to:
receive a request from the user to download one of the sections;
download and display the requested section;
modify the downloaded section in response to user edits; and
transmit the modified section to a computing device.

18. The apparatus of claim 15, wherein the one or more links include a link to an image, the mobile device further to download the image and format the image to fit a screen size of the mobile device.

19. The apparatus of claim 15, wherein the one or more links include a link to a video.

20. The apparatus of claim 15, wherein one or more of the links specifies one or more words in the corresponding section.

* * * * *